US011675870B2

(12) United States Patent
Eder-Pressman et al.

(10) Patent No.: US 11,675,870 B2
(45) Date of Patent: Jun. 13, 2023

(54) AUTOMATING MAPPING BETWEEN CONTENT SCHEMA AND RENDERED PAGES (71) Applicant: Stackbit Inc, Claymont, DE (US)

(72) Inventors: Ohad Eder-Pressman, Claymont, DE (US); Simon Hanukaev, Claymont, DE (US); Dan Barak, Claymont, DE (US)

(73) Assignee: Stackbit Inc., Claymont, DE (US)

( * ) Notice: Subject to any disclaimer, the term of this patent is extended or adjusted under 35 U.S.C. 154(b) by 0 days.

(21) Appl. No.: 17/071,737

(22) Filed: Oct. 15, 2020

(65) Prior Publication Data

US 2021/0109981 A1    Apr. 15, 2021

Related U.S. Application Data (60) Provisional application No. 62/915,433, filed on Oct. 15, 2019.

(51) Int. Cl.
G06F 16/958    (2019.01)
G06F 3/0486    (2013.01)
G06F 16/957    (2019.01)
G06F 16/954    (2019.01)

(52) U.S. Cl.
CPC .......... G06F 16/958 (2019.01); G06F 3/0486 (2013.01); G06F 16/954 (2019.01); G06F 16/9577 (2019.01)

(58) Field of Classification Search
CPC ..................... G06F 16/958; G06F 16/9577
See application file for complete search history.

(56) References Cited

U.S. PATENT DOCUMENTS 9,641,591 B1 *    5/2017    Kolam ............... H04L 67/1014
2019/0278815 A1 *    9/2019    Capon ..................... G06F 16/00

* cited by examiner

Primary Examiner — Scott T Baderman
Assistant Examiner — Seung Woon Jung
(74) Attorney, Agent, or Firm — Newman Du Wors LLP (57) ABSTRACT Disclosed herein are systems and methods for an identity mapping tool that bridges the gap between editing and displaying the contents of a website, regardless of the underlying technology, so as to enable development of an intuitive, visual website-editing experience. The disclosure obtains a website's content, determines relationships between the content and website, and maps the website. The tool obtains access to the content, layouts/templates, and black-box generation process of a website and deduces the correlation between the content's fields and the elements of any of the website's resulting webpages. It taints the content-source data, iteratively feeds it into a site generation process, and inspects the resulting artifacts to determine correlations between fields in the content source and the resulting website. The artifacts may be further employed to generate a user-interface display with controls for facilitating management of the website.

15 Claims, 6 Drawing Sheets

AUTOMATING MAPPING BETWEEN CONTENT SCHEMA AND RENDERED PAGES

CROSS-REFERENCE TO RELATED APPLICATION(S)

This application claims benefit to U.S. Provisional Application No. 62/915,433, filed on Oct. 15, 2019, entitled "AUTOMATING MAPPING BETWEEN CONTENT SCHEMA AND RENDERED PAGES", the contents of all of which are incorporated herein by this reference as though set forth in their entirety, and to which priority and benefit are claimed.

TECHNICAL FIELD

The present application relates generally to website-management tools, and more specifically to methods and systems for the automated mapping and recreation of a website's content that is independent of and separate from the web site's original data and functionality sources.

BACKGROUND

Existing technology allows for the relatively simple creation of websites by almost any individual. For example, users without any coding experience may use services offering drag-and-drop features to build and edit websites. Conventionally, website-management tools are specialized for the underlying technology employed by the website. So once a website is built, only the technology originally used to create it can be used to further maintain the website. This is generally true regardless of whether the website was recently built with sophisticated technology or is a legacy website that has existed for some time.

As a result, any changes to an existing website must be directly done either through coding or through the website-management applications specialized for the website's underlying technology. Such applications often require individualized mechanisms for facilitating website-lifecycle management (e.g., publishing and editing operations). Furthermore, the tools of the original, underlying technology often provide excessively complex non-visual user interfaces (UIs) or only code-based and command-line interfaces, where even advanced technician-users may have difficulty visualizing relationships between a website's content schema and corresponding visually displayed UI components. This results in a disconnect between content-editing and content-displaying capabilities and functionalities. Additionally, any technology that attempts to bridge that disconnect can only be narrowly used for the underlying technology. This further results in unnecessary complexity and lack of flexibility, which inhibits the efficient use of tools for effectively managing—e.g., updating, altering, change-tracking—websites. The resulting specialization and lack of flexibility often constrains use of existing website-management tools to specific elements of a computing environment or ecosystem, whereby the tools are not interoperable with the entire ecosystem.

Thus, what is needed is a management tool that bridges the gap between editing and displaying, regardless of the underlying technology, to enable development of an intuitive, visual website-editing experience. Such a tool may obtain a website's content, determine relationships between the content and website, and map the website. Such a tool may obtain access to the content, layouts/templates, and black-box generation process of a website and deduce the correlation between the content's fields and the elements of any of the website's resulting webpages. It may taint the content-source data, iteratively feed it into a site generation process, and inspect the resulting artifacts to determine correlations between fields in the content source and the resulting website. The artifacts may be employed to generate a user-interface display with controls for facilitating management of the website. A tool for the mapping of content in relation to the rendered schema may be utilized by a website-management system that takes inputted actions (e.g., edits to a website) and translate them into atomic actions, API calls, data manipulations, and/or code changes in the underlying complex systems—thus enabling the direct editing and management of an existing website without requiring direct user-access of the website's underlying technology or content.

In short, such a mapping tool may enable management of existing websites regardless of the original data source and may overcome existing restrictions on website management by allowing for an application that operates independently of the specific technologies originally used to provide content and website-generation functionality. It may enable production of a broad set of artifacts and insights from any given website (e.g., a site map, reusable components, reusable content, and insights regarding the website-wide impact of specific content changes). And it may be implemented to technology beyond websites and site generators. This will provide benefits that the state of the art cannot currently provide.

SUMMARY OF THE DISCLOSURE

The following presents a simplified overview of example embodiments in order to provide a basic understanding of some aspects of the invention. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented herein below. It is to be understood that both the following general description and the following detailed description are exemplary and explanatory only and are not restrictive.

According to some possible implementations, the systems and methods comprise receiving, by a device comprising an encoder and a decoder, a source file from a website data source, wherein the source file is associated with generation of a website via a content delivery network and wherein the website comprises the rendered webpage; selectively tainting, by the device, the received source file; generating, by the device and based on the selectively tainted source file, a request-message, wherein the request-message comprises the selectively tainted source file; transmitting, by the device, the request-message to a website-generation system; retrieving, by the device, a response from the website-generation system, wherein the response comprises a generated website with an artifact; comparing, by the device, the response to the received source file; deducing, by the device and based on comparing the response to the received source file, a relationship between the tainted source file and a webpage element of the rendered webpage by programmatically selectively polling the website-generation system; determining, by the device and based on the deduced relationship between the tainted content information and the webpage element, an exact location of the artifact in relation to the rendered webpage; reconstructing, by the device and based on the determined exact location of the artifact in relation to the rendered webpage, the rendered webpage; and mapping, by the device and based on the reconstructed rendered webpage, the rendered webpage.

Still other advantages, embodiments, and features of the subject disclosure will become readily apparent to those of ordinary skill in the art from the following description wherein there is shown and described a preferred embodiment of the present disclosure, simply by way of illustration of one of the best modes best suited to carry out the subject disclosure. As will be realized, the present disclosure is capable of other different embodiments and its several details are capable of modifications in various other embodiments all without departing from, or limiting, the scope herein.

BRIEF DESCRIPTION OF THE DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

The following detailed description of example implementations refers to the accompanying drawings. The same reference numbers in different drawings may identify the same or similar elements. Before the present methods and systems are disclosed and described, it is to be understood that the methods and systems are not limited to specific methods, components, or to particular implementations. It is also to be understood that the terminology used herein is for the purpose of describing particular embodiments only and is not intended to be limiting. Various implementations are described with reference to the drawings. In the following description, for purposes of explanation, numerous specific details are set forth in order to provide a thorough understanding of one or more implementations. It may be evident, however, that the various implementations and embodiments may be practiced without these specific details. In other instances, well-known structures and devices are shown in block diagram form to facilitate describing these implementations.

Websites may be created through the use of any number of providers, services, and applications that allow for a streamlined, user-friendly approach to website creation. For example, a third-party service provider may host the website and provide all themes and interactions necessary for the efficient creation and subsequent operation of the web site. Modern websites are generally created in silos, where different ingredients are stored and represented by different systems. Examples of silos are static site generator, headless content-management systems, deployment platforms, source code repository, etc. Oftentimes, the integration of these silos and underlying tools requires a significant amount of technical knowledge and expertise.

Additionally, the vast number of silo providers and applications create significant issues if a website is to be maintained or controlled in a single environment separate from and independent of the original underlying technology/service silo used to create and maintain it. This is because each provider or application employs its own Data Source and components to carry out functions such as hosting or operating content management systems. And any changes to a website—e.g., hosting, content-manipulation, editing, or controlling—must be done through those specific components and Data Sources. Without adequate methods and systems for managing and controlling a website content's lifecycle and/or workflows independent of the original, underlying Data Source, control of the website is drastically limited.

Some implementations described herein allow for an identity mapping tool ("Identity Mapping Tool") that enables the creation of a broad management system that may interface with all of the various silos, orchestrate them, and operate them in concert to deliver a user-friendly website-management experience. The Identity Mapping Tool may automatically analyze a website's data sources and generation system(s) to facilitate creation of artifacts that enable the creation of a website-management and/or editing user interface that is separate from and independent of the website's data sources and generation system(s). Accordingly, the Identity Mapping Tool may be interoperable with an entire computing environment or ecosystem, despite disparate or otherwise partly incompatible technologies used by different components or modules of the computing environment.

In some implementations, the Identity Mapping Tool may identify and map the contents of a website by determining the source of the website's content, obtaining the content information, tainting the content information, and running the tainted content information through a website-generation system to deduce relationships and/or correlations between the content fields of the website. The Identity Mapping Tool may utilize the deduced relationships/correlations to map and reconstruct the website's content and provide the necessary data for generation of a UI for website-lifecycle management. The Identity Mapping Tool may accurately determine the location of the content's source and provide changes resulting from the website-lifecycle management UI directly to the source of the content.

In some implementations, the Identity Mapping Tool may determine one or more sources of content ("Data Source") used by a website-generation system to generate a webpage. The Identity Mapping Tool may utilize identified content from the Data Source to selectively generate one or more request-messages to the web site-generation system (and/or to a content management system (CMS) or other data source), wherein the request-messages comprise selectively altered content based on the identified content. The Identity Mapping Tool may retrieve one or more responses from the website-generation system, based on the request-messages, and analyze the responses to deduce one or more relationships or correlations between the webpage's content fields. The Identity Mapping Tool may employ the deduced relationships/correlations and provide it to a user-interface generation and handling system, which may generate one or more UI display screens with one or more UI controls for facilitating management of the webpage.

In some implementations, the one or more sources of content may comprise one or more data files, digital asset management (DAM) systems, and/or CMSs. And in some implementations, when utilizing the Data Source, the Identity Mapping Tool may programmatically selectively poll the website-generation system and analyze the resulting responses to deduce one or more relationships and/or correlations between content fields in the content and one or more webpage elements of the webpage.

In some implementations, the Identity Mapping Tool may generate one or more field maps based on analysis of the resulting responses, wherein the field maps may be based on a webpage structure determined by the Identity Mapping Tool. The analysis may generate results that comprise descriptions of the relationships between webpage content and a displayed version thereof (that is to be displayed via the webpage). The field maps may comprise a data map that describes relationships between content-data elements and corresponding webpage UI components, and/or one or more page maps (e.g., which may specify relationships between webpage UI components and corresponding components of a document object model (DOM) structure or tree characterizing the website and/or accompanying web page). Generated UI-display screens utilizing the Identity Mapping Tool may comprise UI controls for facilitating website-lifecycle management, such as publishing operations and generation of webpage previews, independently of implementation specifics of the CMS or other website content source.

The Identity Mapping Tool thus provides for the modification of existing website-content data regardless of the content's original and/or underlying source and enables the functionality of a user-friendly, one-stop shop for allowing a user to edit the website in an intuitive manner—instead of a user going to and editing the content source, the user makes modifications directly on the website. The Identity Mapping Tool reduces the number of computer-implemented steps, user actions, and data-inputs necessary to edit and manage a website. The Identity Mapping Tool provides a more efficient computer system by reducing the number of systems necessary to edit and manage a website. It also facilitates managing a website by a user and/or device because managing the website does not require direct access, manipulation, or use of the Data Source. In some implementations, a user is not required to go to the Data Source to make changes and need not go through the Data Source used to build or otherwise servicing the website. And when changes are made via the website-lifecycle management tool, the Identity Mapping Tool provides/updates those changes in the Data Source.

Note that while implementations discussed herein comprise selective polling of a website-generation system to ascertain data to automatically construct the website-management and/or editing UI, some implementations may also poll other components of the computing environment, such as a CMS, so as to obtain additional data for informing the accompanying system used to generate the website-management and/or editing UI as to how to generate the UI.

Figure 1A:
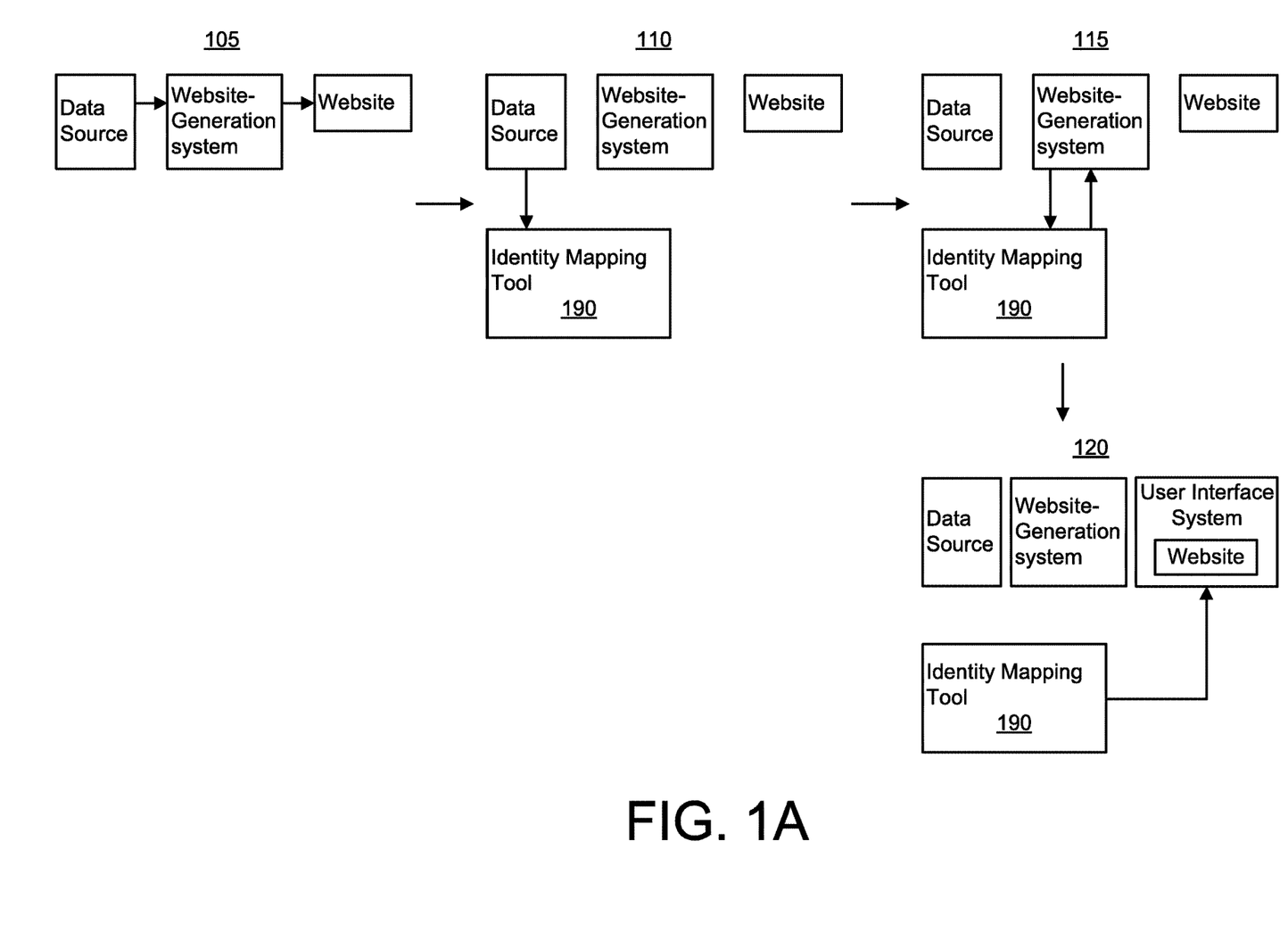
FIGS. 1A-1C are diagrams of an example implementation described here.
Figure 1B:
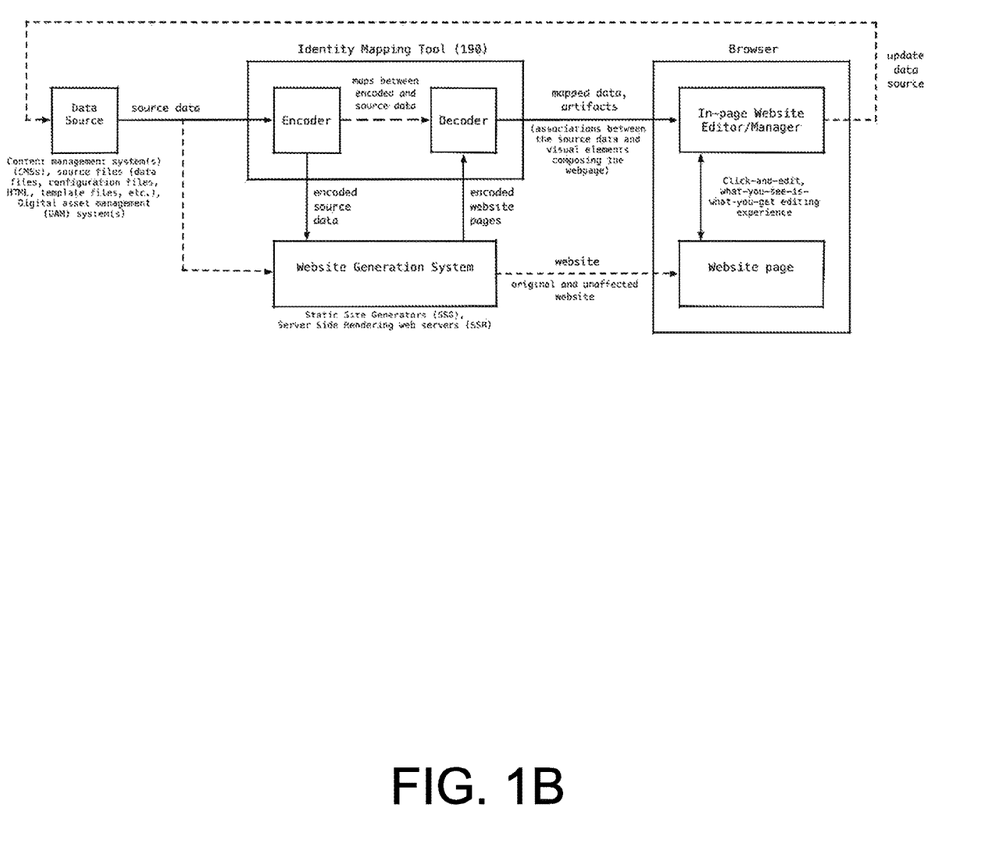
Figure 1C:
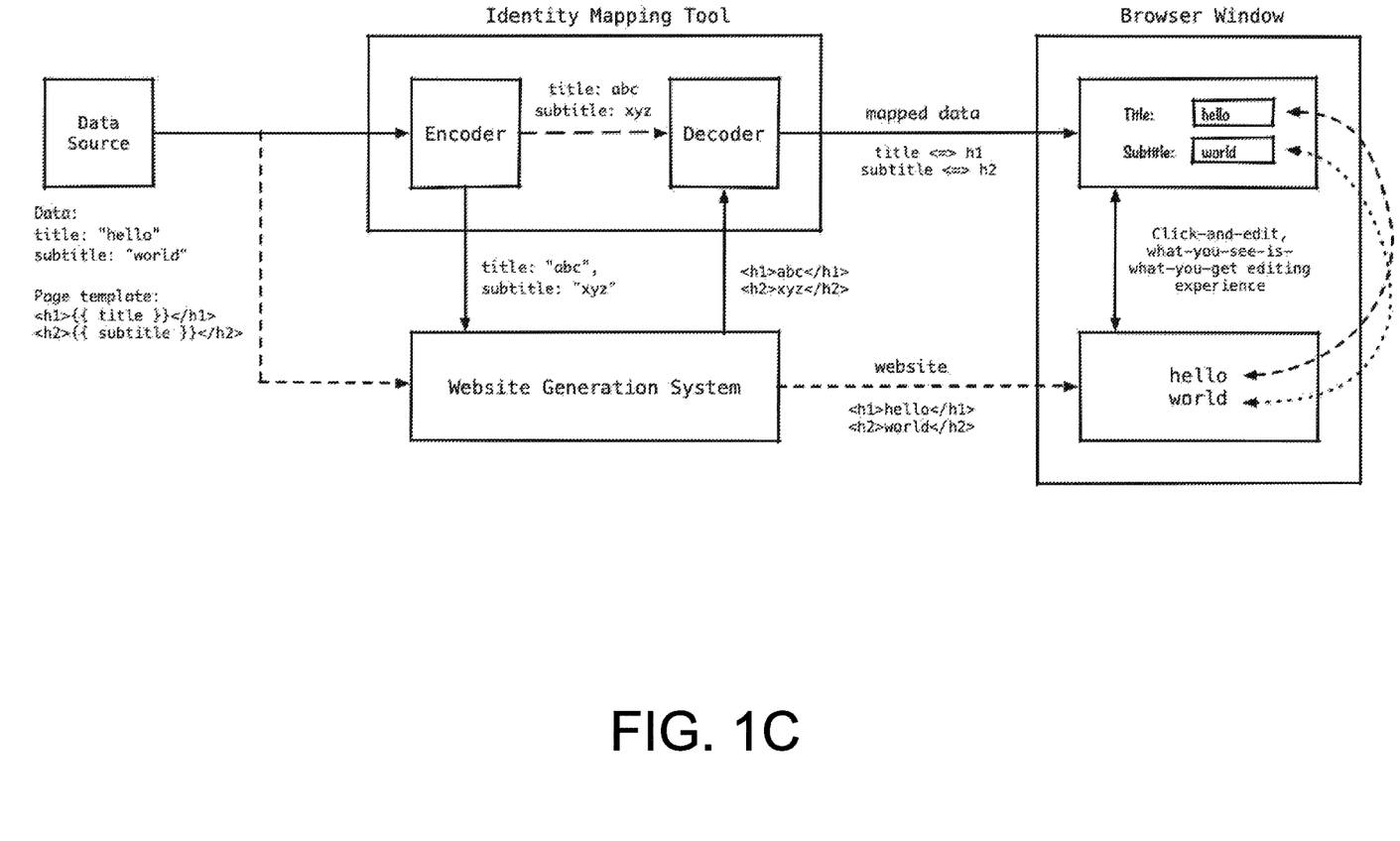

FIGS. 1A-1C are diagrams of an example implementation described here.

As shown in FIG. 1A, the Identity Mapping Tool 190 may enable mapping between the content of a website and the website's rendered webpages to facilitate artifacts that enable a website-lifecycle management user interface. As shown by reference number 105, a Data Source may provide the content and website—generation functionality necessary to create and maintain operation of a website. The Data Source may comprise any number of content management Systems (CMS), databases, and other content sources. For example, in some embodiments, Data Sources may comprise data files (e.g., content source data, HTML) and digital asset management systems (DAM). Data Source may also comprise content, including files such as data, style sheets, templates and accompanying parameters, layout files, configuration files, source code, webhook configuration, and API integrations. A website-generation system(s) may receive content/data from the Data Source for the purpose of creating a website.

As also shown by 105, the website-generation system may generate a website using collections of content from the Data Source. A generated website may include one or more webpages developed using different technologies, such as static site generation, e.g., generation via headless content management systems.

As shown by 110, the Identity Mapping Tool 190 may access the Data Source to obtain a website's content and/or communicate with the website's systems (e.g., CMSs, DAM systems, and/or data files).

As shown by 115, the Identity Mapping Tool 190 may communicate with the website-generation system to determine descriptors or artifacts usable by a UI generation and handling system, for the purpose of generating a website-management and/or editing UI. To determine the artifacts for generating a versatile in-page website editor and UI, the Identity Mapping Tool 190 may issue and initiate pull of selectively altered or tainted content to the website-generation system. The Identity Mapping Tool 190 may use the received content from the Data Source to selectively generate one or more request messages to the website-generation system, wherein the request message(s) may comprise the selectively altered content based on the information from the Data Source.

As also shown by 115, the website-generation system may generate a response (e.g., an altered or tainted webpage or website) based on the tainted input content, which the Identity Mapping Tool 190 may receive from the website-generation system, analyze, and deduce one or more relationships or correlations between the content field(s) of one or more webpage. After receiving, the Identity Mapping Tool 190 may analyze the tainted webpage to determine a set of artifacts for use by a UI generation and handling system. The determined artifacts may represent (or otherwise be derived from) mapped data, such as a data map and/or page map. The data map may represent associations between elements or fields of input content, and UI components of a website and/or accompanying webpage. The page map may specify associations between UI components of the website and an inferred DOM structure or tree. These maps may be employed by the UI-generation and handling system to generate a versatile in-page website manager/editor.

As shown by 120, the Identity Mapping Tool 190 may utilize the determined relationships to enable generation of one or more UI display screens with one or more UI controls for facilitating management of the webpage. In some implementations, the generated UI may comprise not only manager/editor-functionality but also lifecycle-management functionality, which may operate on top of static and/or dynamic websites using models extracted from the website-generation system by the Identity Mapping Tool 190.

The disclosure in FIG. 1A may be modified, e.g., certain steps may be omitted, interchanged, replaced, or detail may be added, without departing from the scope of the present teachings. For example, in some implementations, FIG. 1A may further comprise the Identity Mapping Tool 190 programmatically deducing one or more relationships and/or correlations between content fields in the content and one or more webpage elements of the webpage by selectively polling the website generation system and analyzing resulting responses.

In some implementations, the Identity Mapping Tool 190 may generate one or more field maps (e.g., data maps) based on analysis of the resulting responses, including based on a webpage structure determined based on the analysis. The analysis may produce results that include one or more descriptions of one or more relationships between webpage content and a displayed version thereof that is to be displayed via the webpage. The one or more field maps include a data map, a page map, or any other applicable types of maps. The one or more UI display screens may include one or more UI controls for facilitating web site lifecycle management, including publishing operations and generation of webpage previews, independently of implementation specifics of the CMS.

As shown in FIG. 1B, the Identity Mapping Tool 190 may comprise one or more components for the purpose of mapping between the content of a website and the website's rendered webpages to facilitate mapping between content schema and rendered webpages. In some implementations, the Identity Mapping Tool 190 may comprise an encoder component ("Encoder") and a decoder component ("Decoder").

As shown in FIG. 1B, in some implementations, identified by solid arrow lines, the Identity Mapping Tool 190 obtains source data from the Data Source and passes the data through the Encoder, which produces the encoded data and internal maps (collectively, "internal data") between the source data and encoded source data. The Identity Mapping Tool 190 transfers the encoded data to the website generation system, which generates a website with encoded data embedded into its pages. The Identity Mapping Tool 190 obtains the pages of the generated website and previously generated internal data and passes it through the Decoder. In introspecting the website pages with encoded data, Decoder decodes the encoded data, producing relations between the original data received from the Data Source and the embedded location (both visual and physical locations) of this data in the generated website. For each piece of source data, the Identity Mapping Tool 190 produces exact locations where the source data is used in the generated website. These locations include the exact website pages and the visual element in these pages. These relations, or artifacts, may be used by in-page website editor presented beside the website to create advanced editing capabilities (WYSIWYG, click and edit, etc.) The user of the UI editor may update the data, which is then saved back to the Data Source (via API or another mechanism). Whenever data is updated inside the Data Source, the Identity Mapping Tool 190 is notified (via webhooks, server events, custom triggers, etc.) of the change and undertakes the identity mapping process with the new updated data.

As shown in FIG. 1B, source data may flow in parallel with the source data inputted into the Identity Mapping Tool 190. In some implementations, identified by the dash arrow line, source data may flow from the Data Source directly to the website generation system. The website generation system may use this to generate a website (e.g., an original and unaffected website) that is presented alongside the in-page website editor.

As shown in FIG. 1C, the Identity Mapping Tool 190 obtains source data from the Data Source. The source data may comprise a title, subtitle, and a page template. The Encoder receives the source data and produced encoded data, which it then transfers to the website generation system. The Identity Mapping Tool 190 obtains the pages of the generated website and previously generated internal data from the website generation system and passes it through the Decoder. In introspecting the website pages with encoded data, Decoder decodes the encoded data, producing relations between the original data received from the Data Source and the embedded location (both visual and physical locations) of this data in the generated website. For each piece of source data, the Identity Mapping Tool 190 maps the data by producing exact locations where the source data is used in the generated website. These locations include the exact website pages and the visual element in these pages. These relations, or artifacts, may be used by in-page website editor.

The disclosures in FIGS. 1B and 1C may be modified, e.g., certain steps may be omitted, interchanged, replaced, or detail may be added, without departing from the scope of the present teachings. For example, in some implementations, FIG. 1B may further comprise the Identity Mapping Tool 190 programmatically deducing one or more relationships and/or correlations between content fields in the content and one or more webpage elements of the webpage by selectively polling the website generation system and analyzing resulting responses.

Although the implementations of the Identity Mapping Tool 190 are described herein with respect to particular embodiments thereof, these particular implementations are merely illustrative, and not restrictive. For example, while embodiments are primarily discussed as usable for website-lifecycle managing, in other embodiments, the Identity Mapping Tool 190 may operate with various platforms, regardless of the underlying technologies used by the content-providing platforms. For example, implementation of the Identity Mapping Tool 190 may also facilitate management of other types of documents that rely upon different data sources generated by or provided by different technologies.

Figure 2:
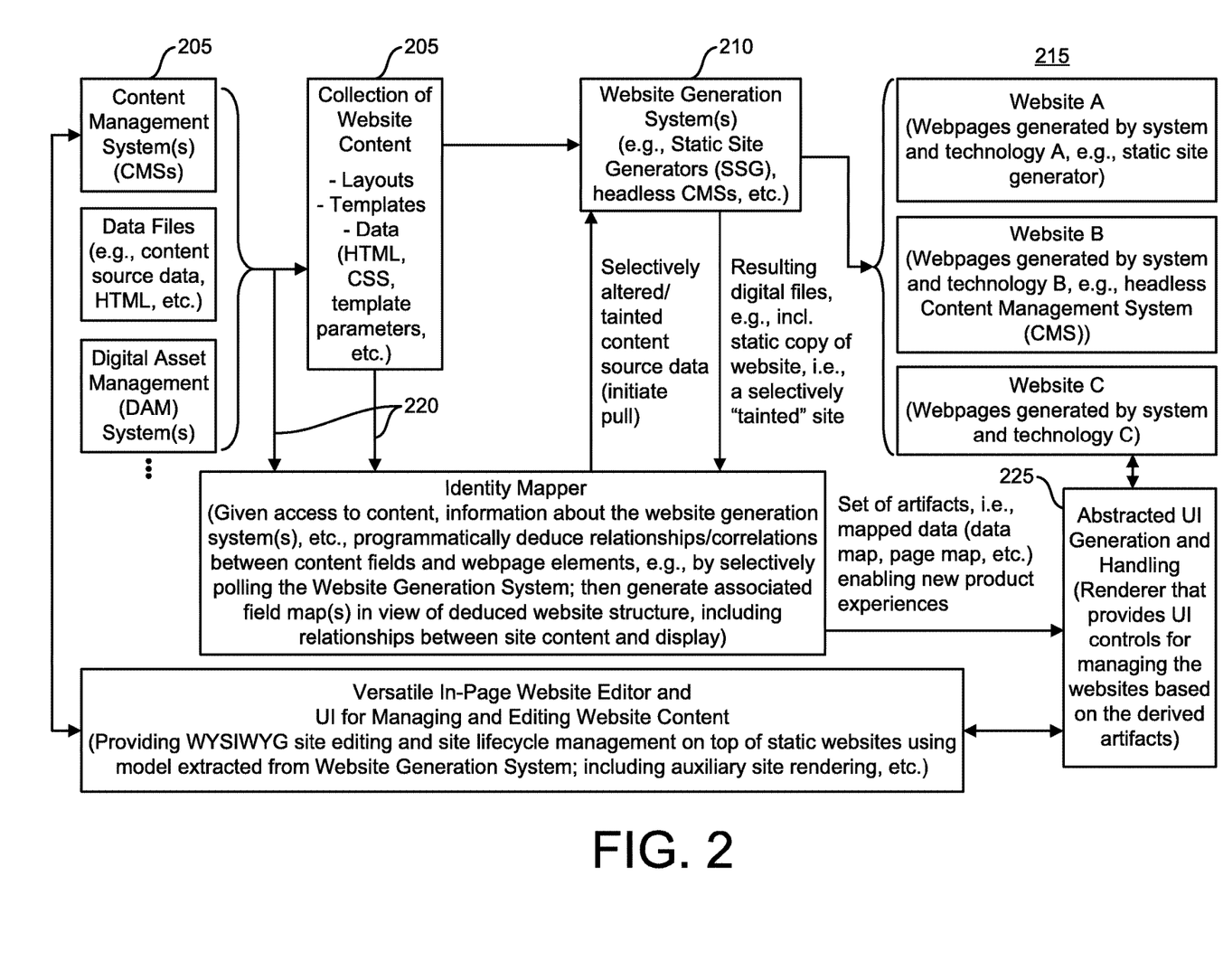
FIG. 2 is a diagram of an example environment in which systems and/or methods, described herein, may be implemented.

FIG. 2 is a diagram of an example environment in which systems and/or methods, described herein, may be implemented. As shown in FIG. 2, the Identity Mapping Tool 190 may enable the mapping between the content of a website and the website's rendered webpages to facilitate generation of a website-lifecycle management user interface. As shown by reference number 205, one or more Data Sources—comprising CMSs, data files, DAMS, and collection of website content—may provide the content and website-generation functionality necessary to create and maintain operation of a website. A website-generation system 210 (e.g., static-site generators, headless CMSs) may receive content/data from the Data Source for the purpose of creating one or more websites 215.

In some implementations, the Identity Mapping Tool 190 may access the Data Sources 220 to obtain a website's content and/or communicate with the website's systems. The Identity Mapping Tool 190 may further communicate with the website-generation system 210 to determine descriptors or artifacts usable by a UI generation and handling system. To determine the artifacts for generating a versatile in-page website editor and UI, the Identity Mapping Tool 190 may issue and initiate pull of selectively altered or tainted content to the website-generation system. In return, the website-generation system may generate a response (e.g., an altered or tainted webpage or website)

based on the tainted input content, which the Identity Mapping Tool 190 may receive from the website-generation system, analyze, and deduce one or more relationships or correlations between the content field(s) of one or more webpage. After receiving, the Identity Mapping Tool 190 may analyze the tainted webpage to determine a set of artifacts for use by the UI generation and handling system. The determined artifacts may represent (or otherwise be derived from) mapped data, such as a data map and/or page map. The data map may represent associations between elements or fields of input content, and UI components of a website and/or accompanying webpage. The page map may specify associations between UI components of the website and an inferred DOM structure or tree. These maps may be employed by the UI-generation and handling system to generate a versatile in-page website manager/editor.

Using the determined artifacts, the Identity Mapping Tool 190 may generate various novel user-experiences without requiring knowledge or use of the Data Source or the website-generation system/process. The Identity Mapping Tool 190 enables computer systems to generate and display WYSIWYG (what-you-see-is-what-you-get) and in-place editing capabilities on top of static sites as a result of the separation between static-site generators and headless CMSs. Using the artifacts, the Identity Mapping Tool 190 enables creation of click-and-edit functionalities—enabling a user to point at an element on a static generated webpage and the Identity Mapping Tool 190 automatically determining what field in the Data Source (e.g, CMS) the content-string in that element came from. This type of mapping-functionality by the Identity Mapping Tool 190 creates in-page editing functionalities, wherein a user may make click-and-edit changes and the Identity Mapping Tool 190 automatically and correctly updates those changes to the Data Source.

The disclosure in FIG. 2 may be modified, e.g., certain steps may be omitted, interchanged, replaced, or detail may be added, without departing from the scope of the present teachings. For example, in some implementations, FIG. 2 may further comprise the Identity Mapping Tool 190 programmatically deducing one or more relationships and/or correlations between content fields in the content and one or more webpage elements of the webpage by selectively polling the website generation system and analyzing resulting responses.

Figure 3:
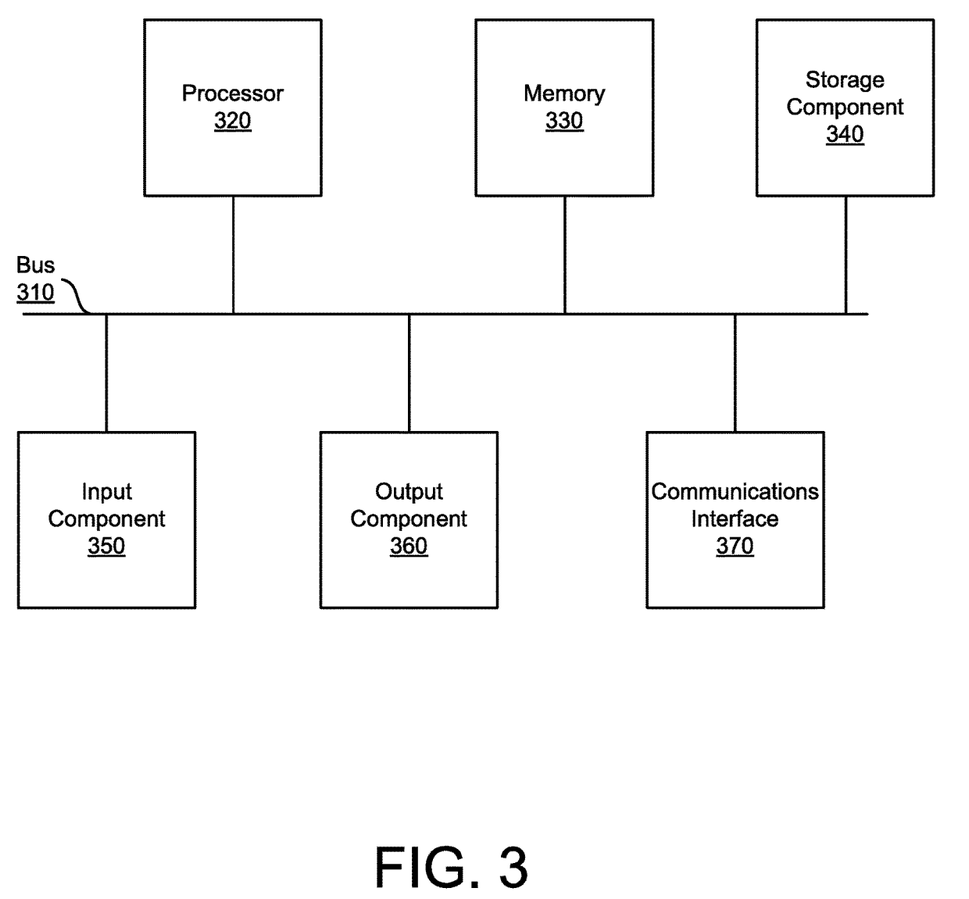
FIG. 3 is a diagram of example components of one or more devices of FIG. 2.

In some implementations, the Identity Mapping Tool 190 may generate one or more field maps (e.g., data maps) based on analysis of the resulting responses, including based on a webpage structure determined based on the analysis. The analysis may produce results that include one or more descriptions of one or more relationships between webpage content and a displayed version thereof that is to be displayed via the webpage. The one or more field maps include a data map, a page map, or any other applicable types of maps. The one or more UI display screens may include one or more UI controls for facilitating web site lifecycle management, including publishing operations and generation of webpage previews, independently of implementation specifics of the CMS FIG. 3 is a diagram of example component of a device 300. Device 300 may correspond to the implementations of FIGS. 1 and 2. Some implementations may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a filed-programmable gate array (FPGA), an application-specific signal processor (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 includes a component that provides output information from device 300 (e.g., a display, a speaker, one or more light-emitting diodes (LEDs), etc.).

Communication interface 370 includes a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus interface, a Wi-Fi interface, a cellular network interface, or the like.

Device 300 may perform one or more processes described herein. Device 300 may perform these processes in response to processor 320 executing software instructions stored by non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage 340 from another computer-readable medium or from another device via communication interface 370. When executed, software instructions stored in memory 330 and/or storage component 340 may cause processor 320 to perform one or more processes descried herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, few components, different components, or differently arranged components than those shown in FIG. 3. Additionally, or alternatively, a set of components of device 300 may perform one or more functions described as being performed by another set of components of device 300.

Figure 4:
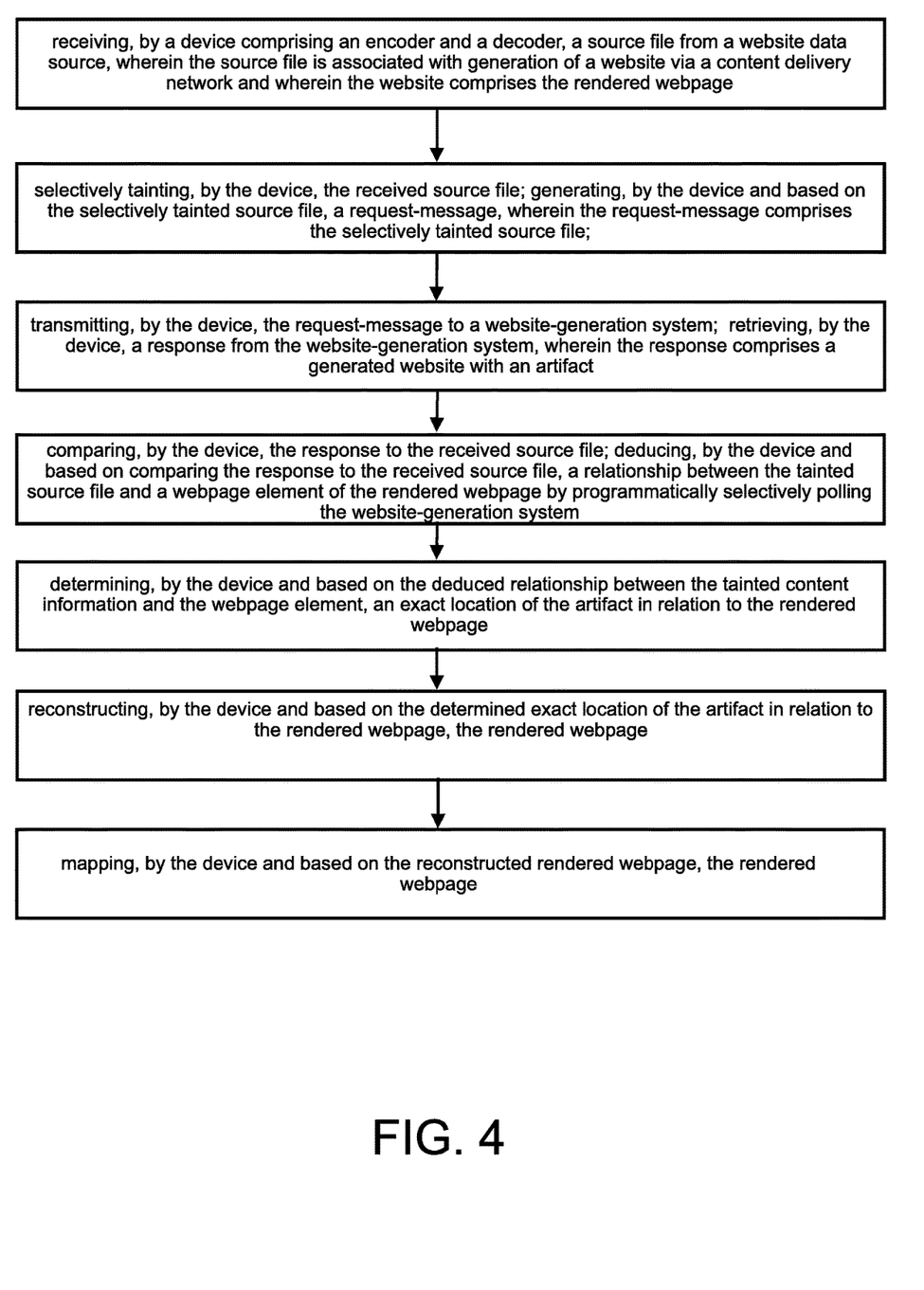
FIG. 4 is a flowchart of an example process for the automated mapping of a rendered webpage.

FIG. 4 is a flowchart of an example process for the automated mapping of a rendered webpage. As shown in FIG. 4, comprise receiving, by a device comprising an encoder and a decoder, a source file from a website data source, wherein the source file is associated with generation of a website via a content delivery network and wherein the website comprises the rendered webpage; selectively tainting, by the device, the received source file; generating, by the device and based on the selectively tainted source file, a request-message, wherein the request-message comprises the selectively tainted source file; transmitting, by the device, the request-message to a website-generation system; retrieving, by the device, a response from the website-generation system, wherein the response comprises a generated website with an artifact; comparing, by the device, the response to the received source file; deducing, by the device and based on comparing the response to the received source file, a relationship between the tainted source file and a webpage element of the rendered webpage by programmatically selectively polling the web site-generation system; determining, by the device and based on the deduced relationship between the tainted content information and the webpage element, an exact location of the artifact in relation to the rendered webpage; reconstructing, by the device and based on the determined exact location of the artifact in relation to the rendered webpage, the rendered webpage; and mapping, by the device and based on the reconstructed rendered webpage, the rendered webpage 1. Although FIG. 4 shows example blocks of process, in some implementations, process may include additional blocks, fewer blocks, different blocks, or differently arranged blocks than those depicted in FIG. 4. Additionally, or alternatively, two or more of the blocks of process may be performed in parallel. FIG. 4 may be a flowchart of an example process for a non-transitory computer readable storage medium storing executable computer program instructions for facilitating direct webpage editing, the computer program instructions comprising instructions that when executed cause a computer processor to: receive, by a device comprising an encoder and a decoder, a source file from a website data source, wherein the source file is associated with generation of a website via a content delivery network and wherein the website comprises the rendered webpage; selectively taint, by the device, the received source file; generate, by the device and based on the selectively tainted source file, a request-message, wherein the request-message comprises the selectively tainted source file; transmit, by the device, the request-message to a web site-generation system; retrieve, by the device, a response from the web site-generation system, wherein the response comprises a generated website with an artifact; compare, by the device, the response to the received source file; deduce, by the device and based on comparing the response to the received source file, a relationship between the tainted source file and a webpage element of the rendered webpage by programmatically selectively polling the web site-generation system; determine, by the device and based on the deduced relationship between the tainted content information and the webpage element, an exact location of the artifact in relation to the rendered webpage; reconstruct, by the device and based on the determined exact location of the artifact in relation to the rendered webpage, the rendered webpage; and map, by the device and based on the reconstructed rendered webpage, the rendered webpage.

In some implementations, FIG. 4 is a flowchart of an example process for a computer system for facilitating direct webpage editing, the system comprising receiving, by a device comprising an encoder and a decoder, a source file from a website data source, wherein the source file is associated with generation of a website via a content delivery network and wherein the website comprises the rendered webpage; selectively tainting, by the device, the received source file; generating, by the device and based on the selectively tainted source file, a request-message, wherein the request-message comprises the selectively tainted source file; transmitting, by the device, the request-message to a website-generation system; retrieving, by the device, a response from the website-generation system, wherein the response comprises a generated website with an artifact; comparing, by the device, the response to the received source file; deducing, by the device and based on comparing the response to the received source file, a relationship between the tainted source file and a webpage element of the rendered webpage by programmatically selectively polling the website-generation system; determining, by the device and based on the deduced relationship between the tainted content information and the webpage element, an exact location of the artifact in relation to the rendered webpage; reconstructing, by the device and based on the determined exact location of the artifact in relation to the rendered webpage, the rendered webpage; and mapping, by the device and based on the reconstructed rendered webpage, the rendered webpage.

Although the implementations of the Identity Mapping Tool are described herein with respect to particular embodiments thereof, these particular implementations are merely illustrative, and not restrictive. For example, while embodiments are primarily discussed as usable for identity mapping and web site-lifecycle managing, in other embodiments, the Identity Mapping Tool may operate with various platforms, regardless of the underlying technologies used by the content-providing platforms. For example, implementation of the Identity Mapping Tool may also facilitate management of other types of documents that rely upon different data sources generated by or provided by different technologies.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all embodiments of this application including, but not limited to, steps in disclosed methods. Thus, if there are a variety of additional steps that may be performed it is understood that each of these additional steps may be performed with any specific embodiment or combination of embodiments of the disclosed methods.

Embodiments of the systems and methods are described with reference to schematic diagrams, block diagrams, and flowchart illustrations of methods, systems, apparatuses and computer program products. It will be understood that each block of the block diagrams, schematic diagrams, and flowchart illustrations, and combinations of blocks in the block diagrams, schematic diagrams, and flowchart illustrations, respectively, may be implemented by computer program instructions. These computer program instructions may be loaded onto a general-purpose computer, special purpose computer, or other programmable data processing apparatus to produce a machine, such that the instructions which execute on the computer or other programmable data processing apparatus create a means for implementing the functions specified in the flowchart block or blocks.

Other embodiments may comprise overlay features demonstrating relationships between one more steps, active users, previous users, missing steps, errors in the workflow, analytical data from use of the workflow, future use of the workflow, and other data related to the workflow, users, or the relationship between the workflow and users.

In addition, the various illustrative logical blocks, modules, and circuits described in connection with certain embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, system-on-a-chip, or state machine. A processor may also be implemented as a combination of computing devices, e.g., a combination of a DSP and a microprocessor, a plurality of microprocessors, one or more microprocessors in conjunction with a DSP core, or any other such configuration.

Furthermore, the one or more versions may be implemented as a method, apparatus, or article of manufacture using standard programming and/or engineering techniques to produce software, firmware, hardware, or any combination thereof to control a computer to implement the disclosed embodiments. Non-transitory computer readable media may include but are not limited to magnetic storage devices (e.g., hard disk, floppy disk, magnetic strips), optical disks (e.g., compact disk (CD), digital versatile disk (DVD)), smart cards, and flash memory devices (e.g., card, stick). Those skilled in the art will recognize many modifications may be made to this configuration without departing from the scope of the disclosed embodiments.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order; it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

What is claimed:

1. A computer-implemented method for automating mapping of a rendered webpage, the method comprising:
   receiving, by a device comprising an encoder and a decoder, a source file from a website data source, wherein the source file is associated with generation of a website via a content delivery network and wherein the website comprises the rendered webpage;
   selectively tainting, by the device, the received source file;
   first generating, by the device and based on the selectively tainted source file, a request-message, wherein the request-message comprises the selectively tainted source file;
   transmitting, by the device, the request-message to a website-generation system;
   retrieving, by the device, a response from the website-generation system, wherein the response comprises a generated website with an artifact;
   comparing, by the device, the response to the received source file;
   deducing, by the device and based on comparing the response to the received source file, a relationship between the tainted source file and a webpage element of the rendered webpage by programmatically selectively polling the website-generation system;
   determining, by the device and based on the deduced relationship between the tainted content information and the webpage element, an exact location of the artifact in relation to the rendered webpage;
   reconstructing, by the device and based on the determined exact location of the artifact in relation to the rendered webpage, the rendered webpage, wherein the artifact is associated with mapped data, wherein the mapped data comprises at least one of a data map and a page map, wherein the data map represents associations between an element of an input content and user-interface components of the rendered webpage, and wherein the page map represents associations between the user-interface components of the rendered webpage and an inferred document object model structure;
   mapping, by the device and based on the reconstructed rendered webpage, at least one of the element of the input content or the inferred document object model structure to the user-interface components of the rendered webpage; and
   second generating, based at least in part on the mapping, a user interface separate from the website data source, for editing the rendered webpage based at least in part on at least one change to the website data source that results in the editing of the rendered webpage.

2. The method of claim 1, wherein the website data source comprises at least one of a content management system, a database, a data file, and a digital asset management system.

3. The method of claim 1, wherein the artifact comprises the mapped data.

4. The method of claim 1, further comprising:
generating, by the device and based on the deduced relationship between the tainted content information and the webpage element, a field map.

5. The method of claim 1, further comprising:
receiving, based at least in part on the second generating, inputted actions associated with the at least one change to the website data source that results in the editing of the rendered webpage.

6. A non-transitory computer readable storage medium storing executable computer program instructions for facilitating direct webpage editing, the computer program instructions comprising instructions that when executed cause a computer processor to:
receive, by a device comprising an encoder and a decoder, a source file from a website data source, wherein the source file is associated with generation of a website via a content delivery network and wherein the website comprises the rendered webpage;
selectively taint, by the device, the received source file;
first generate, by the device and based on the selectively tainted source file, a request-message, wherein the request-message comprises the selectively tainted source file;
transmit, by the device, the request-message to a website-generation system;
retrieve, by the device, a response from the website-generation system, wherein the response comprises a generated website with an artifact;
compare, by the device, the response to the received source file;
deduce, by the device and based on comparing the response to the received source file, a relationship between the tainted source file and a webpage element of the rendered webpage by programmatically selectively polling the website-generation system;
determine, by the device and based on the deduced relationship between the tainted content information and the webpage element, an exact location of the artifact in relation to the rendered webpage;
reconstruct, by the device and based on the determined exact location of the artifact in relation to the rendered webpage, the rendered webpage, wherein the artifact is associated with mapped data, wherein the mapped data comprises at least one of a data map and a page map, wherein the data map represents associations between an element of an input content and user-interface components of the rendered webpage, and wherein the page map represents associations between the user-interface components of the rendered webpage and an inferred document object model structure;
map, by the device and based on the reconstructed rendered webpage, at least one of the element of the input content or the inferred document object model structure to the user-interface components of the rendered webpage; and
second generate, based at least in part on the mapped rendered webpage,
a user interface separate from the website data source, for editing the rendered webpage based at least in part on at least one change to the website data source that results in the editing of the rendered webpage.

7. The computer readable medium of claim 6, wherein the website data source comprises at least one of a content management system, a database, a data file, and a digital asset management system.

8. The computer readable medium of claim 6, wherein the artifact comprises the mapped data.

9. The computer readable medium of claim 6, wherein the computer program instructions for facilitating direct webpage editing further comprise instructions that when executed cause the computer processor to:
generate, by the device and based on the deduced relationship between the tainted content information and the webpage element, a field map.

10. The computer readable medium of claim 6, wherein the computer program instructions for facilitating direct webpage editing further comprise instructions that when executed cause the computer processor to:
receive, based at least in part on the second generating, inputted actions associated with the at least one change to the website data source that results in the editing of the rendered webpage.

11. A computer system comprising a processor for performing operations, the operations comprising:
receiving, by a device comprising an encoder and a decoder, a source file from a website data source, wherein the source file is associated with generation of a website via a content delivery network and wherein the website comprises the rendered webpage;
selectively tainting, by the device, the received source file;
first generating, by the device and based on the selectively tainted source file, a request-message, wherein the request-message comprises the selectively tainted source file;
transmitting, by the device, the request-message to a website-generation system;
retrieving, by the device, a response from the website-generation system, wherein the response comprises a generated website with an artifact;
comparing, by the device, the response to the received source file;
deducing, by the device and based on comparing the response to the received source file, a relationship between the tainted source file and a webpage element of the rendered webpage by programmatically selectively polling the website-generation system;
determining, by the device and based on the deduced relationship between the tainted content information and the webpage element, an exact location of the artifact in relation to the rendered webpage;
reconstructing, by the device and based on the determined exact location of the artifact in relation to the rendered webpage, the rendered webpage, wherein the artifact is associated with mapped data, wherein the mapped data comprises at least one of a data map and a page map, wherein the data map represents associations between an element of an input content and user-interface components of the rendered webpage, and wherein the page map represents associations between the user-interface components of the rendered webpage and an inferred document object model structure;
mapping, by the device and based on the reconstructed rendered webpage, at least one of the element of the input content or the inferred document object model structure to the user-interface components of the rendered webpage; and second generating, based at least in part on the mapping, a user interface separate from the website data source, for editing the rendered webpage based at least in part on at least one change to the website data source that results in the editing of the rendered webpage.

12. The system of claim 11, wherein the website data source comprises at least one of a content management system, a database, a data file, and a digital asset management system.

13. The system of claim 11, wherein the artifact comprises the mapped data.

14. The system of claim 11, further comprising:
generating, by the device and based on the deduced relationship between the tainted content information and the webpage element, a field map.

15. The system of claim 11, further comprising:
receiving, based at least in part on the second generating, inputted actions associated with the at least one change to the website data source that results in the editing of the rendered webpage.

* * * * *